United States Patent [19]
Hymel

[11] 3,799,371
[45] Mar. 26, 1974

[54] APPARATUS FOR UNLOADING SUGARCANE

[76] Inventor: Moise J. Hymel, P.O. Box H, Gramercy, La. 70052

[22] Filed: Jan. 7, 1972

[21] Appl. No.: 216,058

[52] U.S. Cl. .............................. 214/44 R, 294/112
[51] Int. Cl. ........................................... B65g 67/02
[58] Field of Search ............ 214/38 CA, 44 R, 650; 294/112

[56] References Cited
UNITED STATES PATENTS
3,533,525  10/1970  Cancienne ..................... 214/38 CA
2,259,376  10/1941  Guild ................................. 294/112

*Primary Examiner*—Robert G. Sheridan
*Attorney, Agent, or Firm*—Clarence A. O'Brien; Harvey B. Jacobson

[57] ABSTRACT

Sugarcane is removed from the load-containing enclosure of a vehicle, such as a cart provided with enclosed sides and an open top, by arranging fingers of a grab outside of and surrounding the load-containing enclosure, and engaging the load through openings provided in the walls of the load-containing enclosure and removing the load by lifting same through the open top of the load-containing enclosure. The openings in the walls extend from the open top to the bottom of a load-holding enclosure. The grab has a single head, a first shaft, at least two pairs of fingers pivotally mounted on the first shaft for forming jaws, longitudinally extending members pivotally connected to the fingers and the head, a second shaft, at least two linkages connecting the second shaft to the first shaft for movement toward and away from one another, and pulley block and tackle for moving the second shaft toward and away from the first shaft for opening and closing, respectively, the jaws.

6 Claims, 9 Drawing Figures

PATENTED MAR 26 1974 3,799,371

APPARATUS FOR UNLOADING SUGARCANE

BACKGROUND OF THE INVENTION

1. Field of the Invention

This invention relates to a method for removing a load, especially sugarcane, from a load-containing enclosure, and to apparatus including a grab and a vehicle provided with a load-holding enclosure for carrying out the method.

2. Description of the Prior Art

It is known to remove, for example, sugarcane from a cart and transport it to, for example, a trailer by dropping a grab into the cart with the aid of a crane and grabbing cane at random. This approach requires several grabs to unload a filled cart. An example of a grab used to unload sugarcane in this manner may be seen in U. S. Pat. No. 2,259,376.

SUMMARY OF THE INVENTION

It is an object of the present invention to provide a method for moving a load from a load-containing enclosure with only a single grabbing operation.

It is also an object of the present invention to provide an improved grab and a special load-holding enclosure which cooperate with one another to carry out the method according to the present invention.

These and other objects are achieved according to the present invention by providing apparatus for removing a load from a load-containing enclosure provided with walls defining an open top by the steps of arranging fingers of a grab outside of and surrounding the load-containing enclosure, and engaging the load through openings provided in the walls of the load-containing area nad removing the load by lifting same through the open top of the load-containing area.

Apparatus for carrying out the method preferably has a grab including fingers, and a load-holding enclosure including walls defining an open top and openings for permitting the grab fingers to be arranged outside of and surrounding the load-containing enclosure and for engaging and removing the load by lifting same from the load-containing enclosure.

A preferred embodiment of a grab suitable for use in carrying out the method according to the present invention has a single head, a first shaft, at least two parts of fingers pivotally mounted on the first shaft for forming jaws, longitudinally extending members pivotally connected to the fingers and the head, a second shaft, at least two linkages connecting the second shaft to the first shaft for movement toward and away from one another, and means for moving the second shaft toward and away from the first shaft for opening and closing, respectively, the jaws.

The load-holding enclosure, which may be part of a vehicle, has a bottom, and the openings defined by the walls extend from the open top to the bottom. Portions may be arranged near the open top and around the openings for bracing the walls and guiding the fingers.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
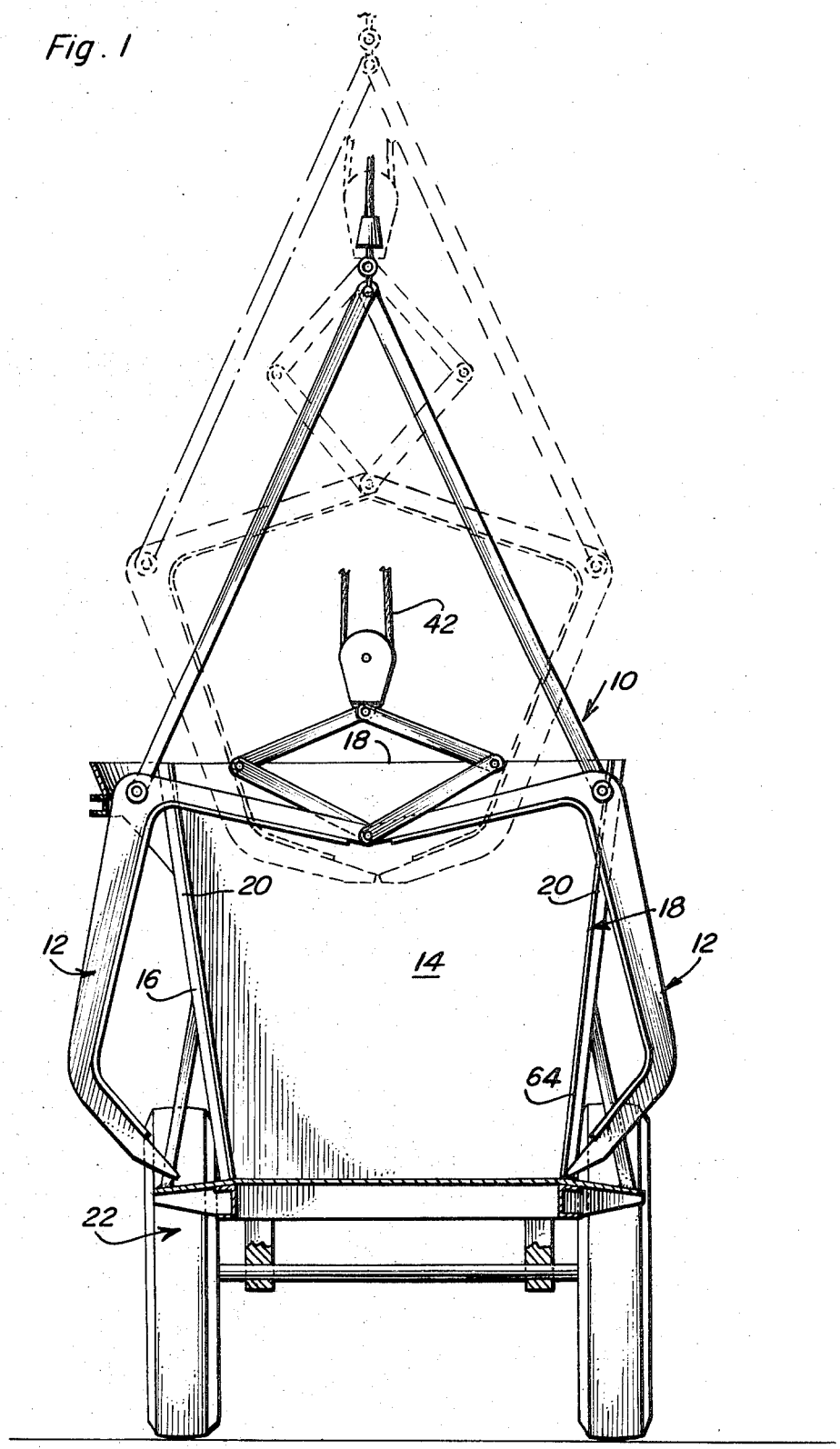
FIG. 1 is a vertical transverse sectional view showing a grab and load-holding enclosure according to the present invention.

FIG. 1 of the drawings shows a grab 10 having fingers 12, and a load-containing, or holding, enclosure 14 provided with walls 16 defining an open top 18 and openings 20 for permitting the grab fingers 12 to be arranged outside of and surrounding the load-containing enclosure 14 and engaging and removing a load in the load-containing enclosure by lifting same from the load-containing enclosure. Load-containing enclosure 14 may be part of a vehicle 22, such as a cart used for transporting sugarcane.

Referring now to FIGS. 2 through 5, grab 10 has a head 23, connected to a holding line 24, a first shaft 25, at least two pairs of fingers 12 pivotally mounted on first shaft 25 for forming jaws 26. Longitudinally extending members 28 are pivotally connected to fingers 12 and head 23 as by pins and sleeve assemblies 29. Rods 30 are arranged between pairs of members 28 to provide rigidity. A second shaft 32 has at least two linkages 34 connected thereto and to shaft 25 for permitting movement of shafts 25, 32 toward and away from one another. Linkages 34 each have four links 36 pivotally connected to shafts 25, 32 and to rods 38 by sleeves 40. The various sleeves may be connected to their respective elements in a suitable, known manner, such as by welding.

Figure 2:
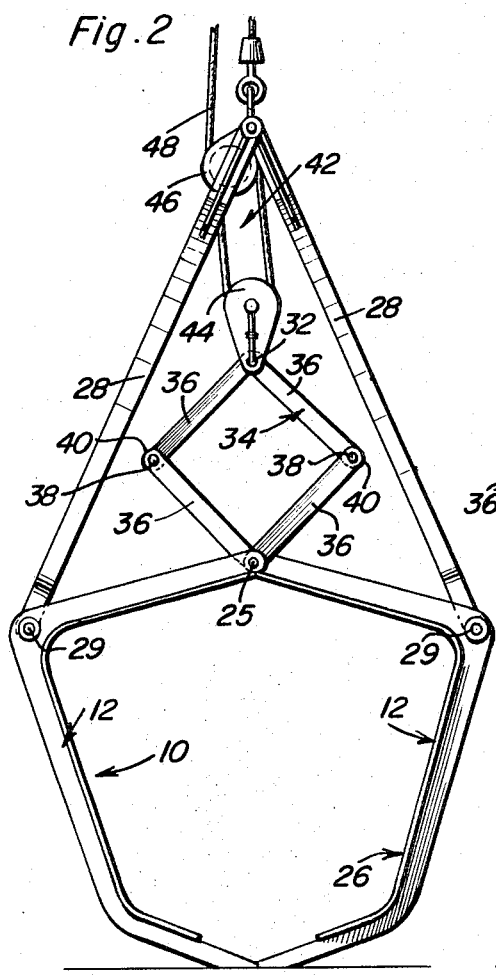
FIG. 2 is an end elevational view showing a grab according to the present invention.
Figure 3:
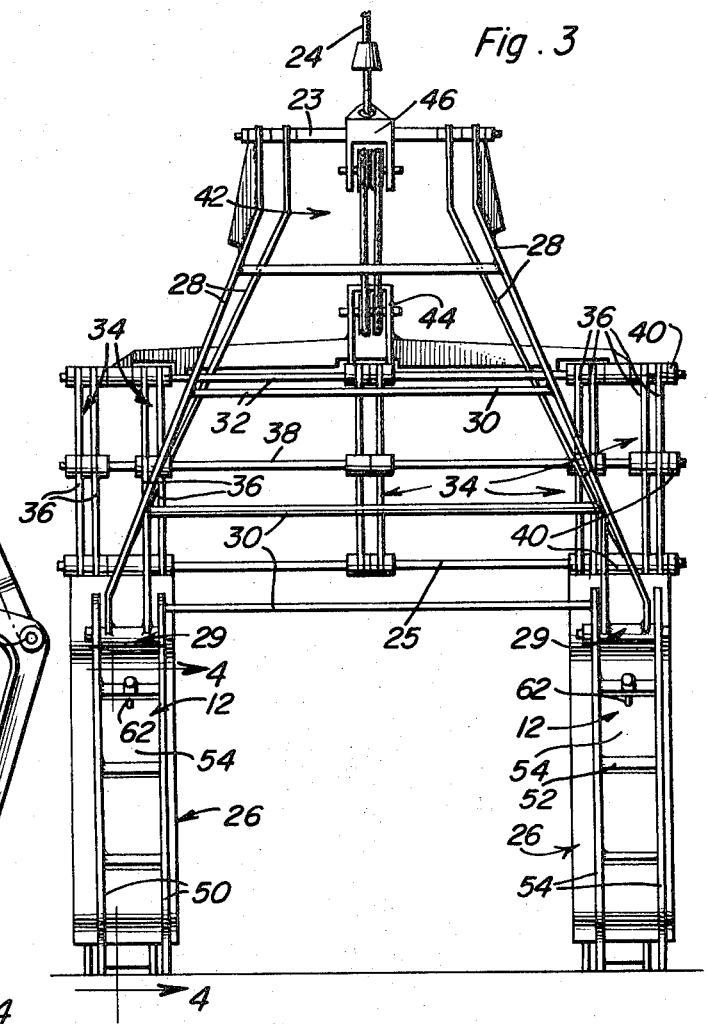
FIG. 3 is a side elevational view showing the grab of FIG. 2.

Five linkages 34 are shown in FIGS. 2 and 3 of the drawings, and are four-bar linkages in the form of a pantograph.

Means 42 is provided for moving shaft 32 toward and away from sahft 32 for opening and closing, respectively, jaws 26. Means 42 is preferably in the form of a pulley block and tackle assembly with seats of pulleys 44 connected to shaft 25 and sets of pulleys 46 connected to head 23. A cable 48 extends to an operating device (not shown).

Figure 4:
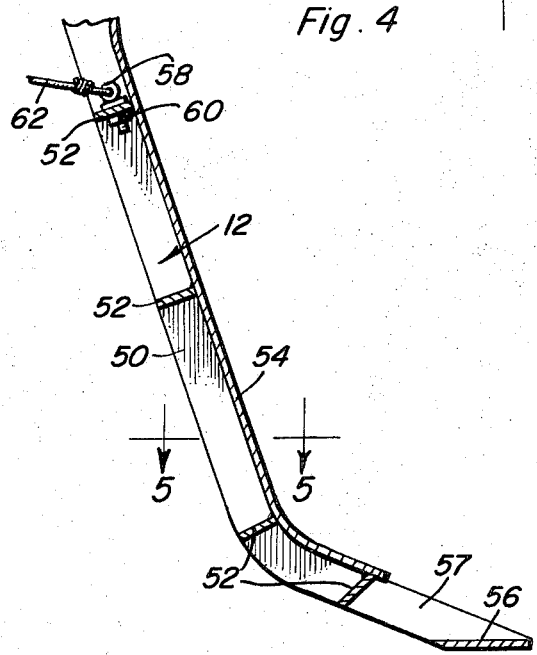
FIG. 4 is a fragmentary sectional view taken generally along the line 4—4 of FIG. 3.
Figure 5:
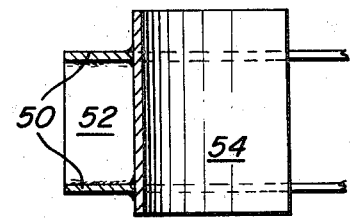
FIG. 5 is a fragmentary sectional view taken generally on the line 5—5 of FIG. 4.
Figure 6:
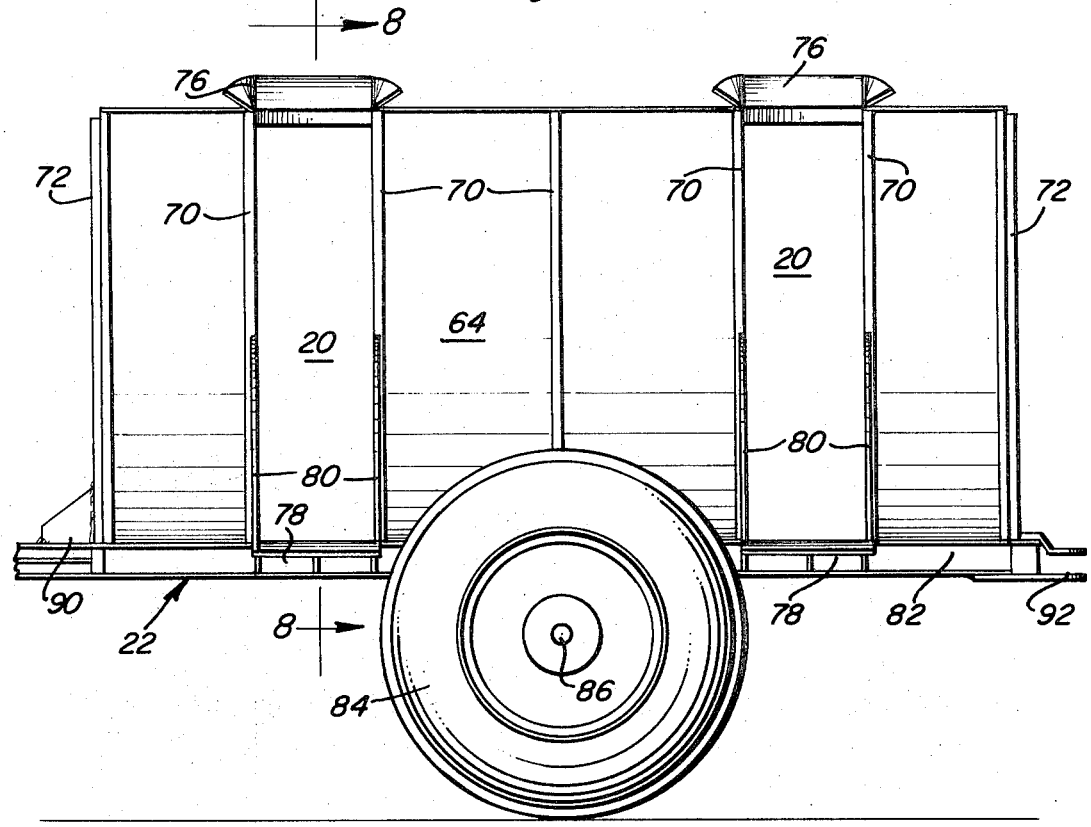
FIG. 6 is a side elevational view showing a vehicle having a load-holding enclosure according to the present invention.
Figure 7:
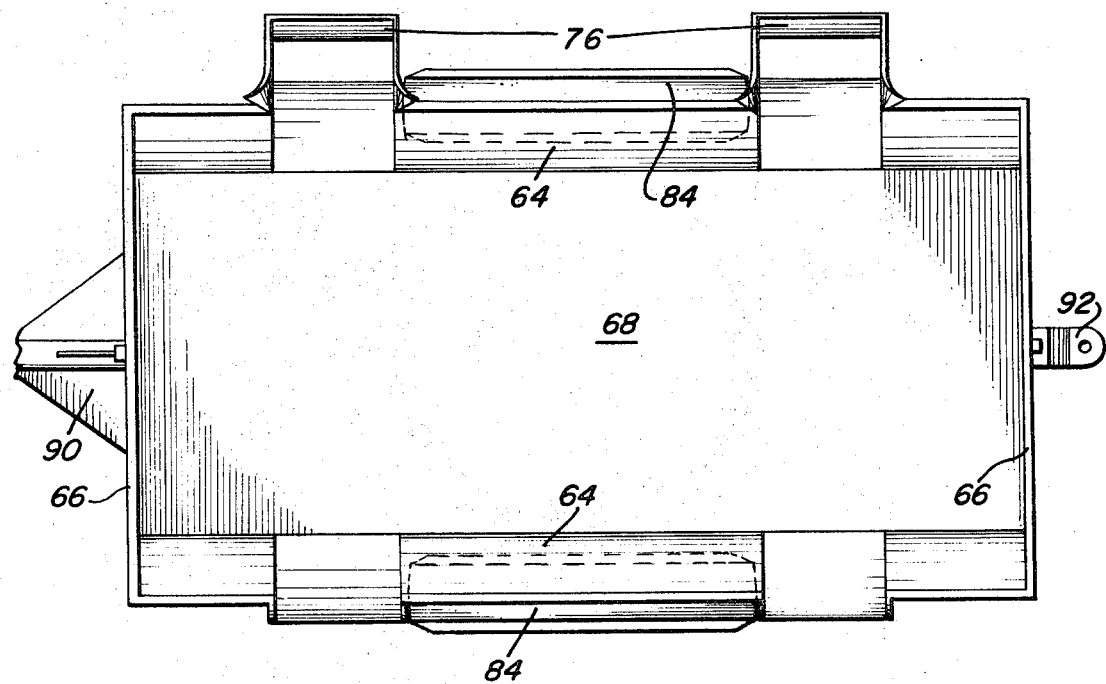
FIG. 7 is a top plan view of the structure of FIG. 6.
Figure 8:
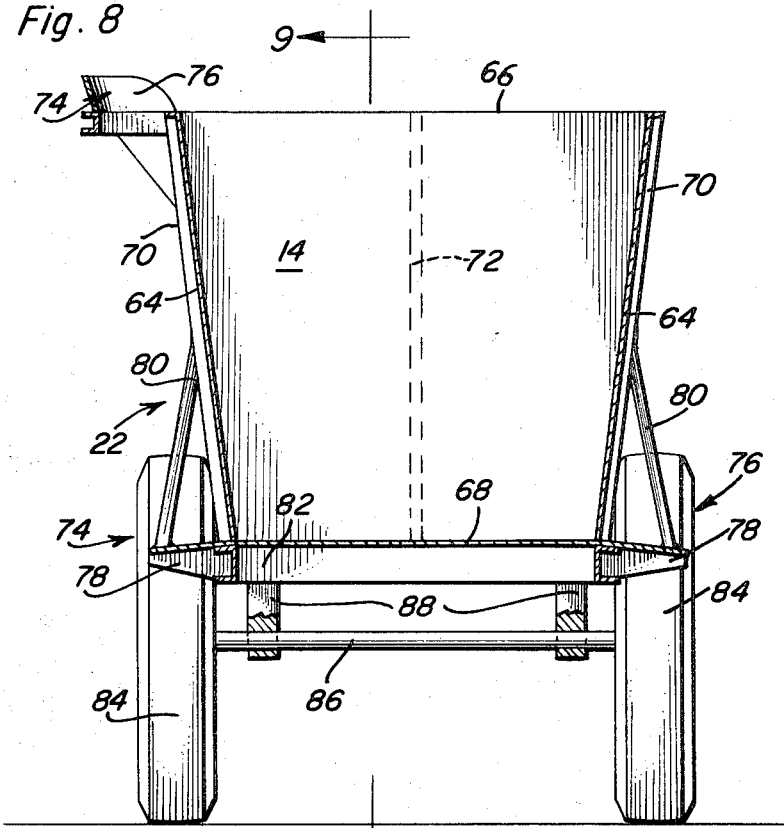
FIG. 8 is a sectional view taken generally along the line 8—8 of FIG. 6.
Figure 9:
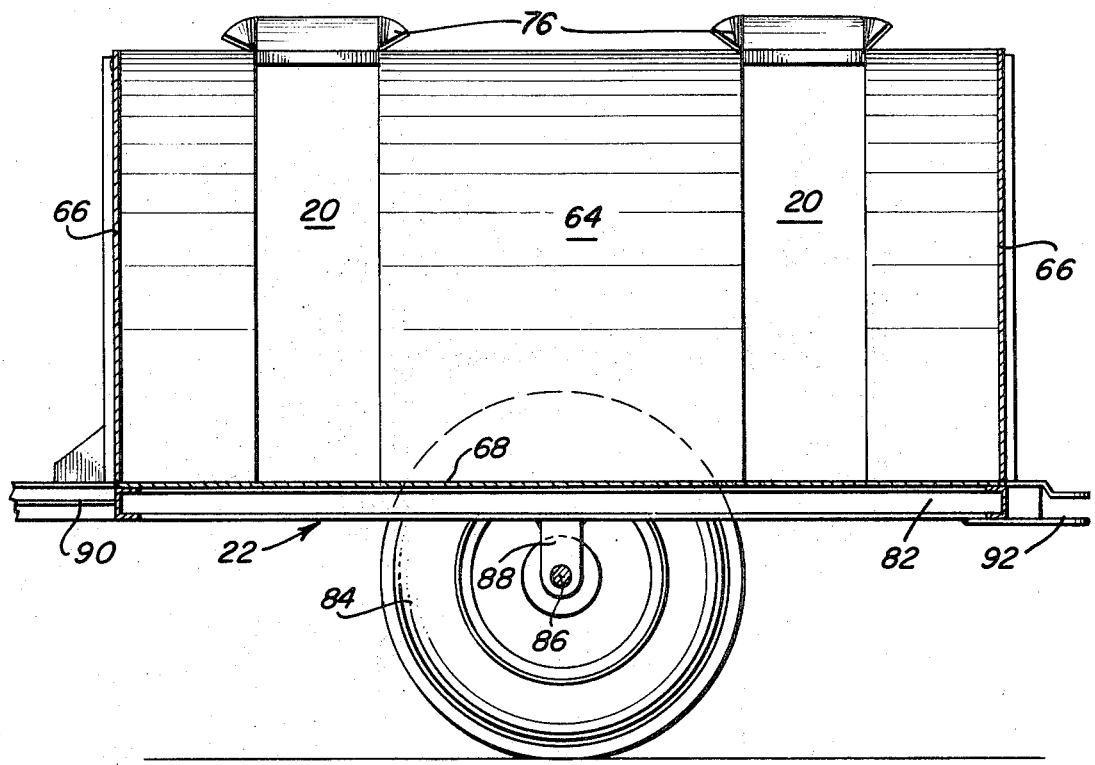
FIG. 9 is a sectional view taken generally along the line 9—9 of FIG. 8.

FIGS. 4 and 5 show details of fingers 12. Each finger 12 has a pair of side plates 50 with a plurality of ribs 52 arranged therebetween and covered by a cover plate 54. A spacer plate 56 is arranged at the tip of each finger 12. Side plates 50, ribs 52, cover plate 54 and spacer plate 56 may be connected together in a suitable, known manner, such as welding.

Each finger 12 has an eyebolt 58 and a nut 60 mounted on a rib 52. A tag line 62 is fastened to the eye of eyebolt 58.

FIGS. 6 through 9 of the drawings show a preferred embodiment of a vehicle 22. Walls 16 include side walls 64 and end walls 66. Enclosure 14 also has a substantially planar bottom 68. Openings 20 extend from the open top 18 to bottom 68. A plurality of reinforcing ribs 70, 72 are arranged about walls 16 to assure sufficient rigidity of enclosure 14.

Portions 74 are preferably provided on at least one wall 16, and arranged near open top 18 and around openings 20 for bracing walls 16 and guiding fingers 12. In the embodiment shown in FIGS. 6 through 9 of the drawings, portions 74 are arranged about openings 20 on one side wall 64, and include guide 76 and platform 78. Braces 80 may be connected between platform 78 and side wall 64 for additional rigidity.

Vehicle 22 has a frame 82 to which wheels 84 are rotatably mounted by means of an axle 86 rotatably journaled in blocks 88 connected to frame 10. Hitches 90, 92 may be provided in any known manner for attaching vehicle 22 to, for example, a tractor, another vehicle 22, or the like.

To remove a load (not shown) from enclosure 14, grab 10 is attached to a suitable, known crane (not shown) by holding line 24. Cable 48 and tag lines 62 are arranged so that the movement of grab 10 at the end of line 24 can be controlled. Means 42 is adjusted such that fingers 12 are in the position shown in FIG. 1 of the drawings and jaws 26 are open. Fingers 12 are now arranged by appropriate movement of grab 10 outside of and surrounding load-containing enclosure 14. Means 42 is now adjusted so that fingers 12 take the position shown in FIG. 2 of the drawings, and jaws 26 close. The tips 57 of fingers 12 will move through openings 20 into enclosure 14 while jaws 26 are being closed, and in this manner will engage a load in enclosure 14 and remove that load by lifting same through open top 18. Since tops 57 will enter enclosure 14 at the bottom 68 thereof, grab 10 will remove the entire load from enclosure 14 with only one grab. This can result in a man-hour savings of 50 percent or more.

It is to be understood that although the use of grab 10 and enclosure 14 has been discussed above in relation to the transport of sugarcane, any suitable articles or containers may be so removed from an enclosure 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for removing a load from a load-containing enclosure, comprising, in combination:
   a. a grab including:
      i. a single head;
      ii. a first shaft;
      iii. two fingers pivotally mounted on the first shaft for forming;
      iv. longitudinally extending members pivotally connected to the fingers and the single head;
      v. a second shaft;
      vi. means forming a four-bar linkage for connecting the second shaft to the first shaft and permitting movement of the shafts toward and away from one another; and
      vii. means for moving the second shaft toward and away from the first shaft and opening and closing, respectively, the jaws and
   b. a load-containing enclosure including:
      i. a substantially planar bottom;
      ii. walls extending from the bottom and defining an open top;
      iii. opposed openings provided in the walls and arranged extending from the bottom to the open top for permitting the grab fingers to be arranged outside of and surrounding the load containing area and engaging and removing a load from the load-containing enclosure by lifting the load therefrom.

2. A structure as defined in claim 1, wherein there are two pairs of opposed openings and grab fingers, the fingers arranged to move through the openings.

3. A structure as defined in claim 1, wherein said walls include portions arranged near the bottom, the open top and around said openings for bracing the walls and guiding said fingers.

4. A structure as defined in claim 3, wherein said load-containing enclosure is a part of a vehicle.

5. A structure as defined in claim 4, wherein there are two pairs of opposed openings and grab fingers, the fingers arranged to move through the openings.

6. A structure as defined in claim 1, wherein said load-containing enclosure is a part of a vehicle.

* * * * *